Patented Sept. 25, 1951

2,569,137

UNITED STATES PATENT OFFICE 2,569,137

METHOD OF JOINING A PLURALITY OF METAL CONTAINERS

Henry A. Westrich, Racine, Wis., assignor to S. C. Johnson & Son, Inc., Racine, Wis.

No Drawing. Application November 12, 1949, Serial No. 126,921

8 Claims. (Cl. 219—10)

This invention relates to a method of joining a plurality of metal containers. More particularly, it relates to a method of joining a plurality of metal containers by means of resistance welding effected at the rims of said containers.

Frequently in the past it has been desired to join metal containers in the public product consumption field, especially for use in sales and merchandising schemes, product combinations, etc. To accomplish these ends, containers have been combined by means of adhesives, binding, etc. These methods have proved costly and furthermore, the resultant container combination usually assumes a degree of unattractiveness from the exterior appearance of the binding agent.

In an effort to discover a means by which a plurality of such containers could be joined and yet the cost and undesirable appearance of the exterior binding agents eliminated, applicant appreciated the possibility of welding the containers. However, it was deemed necessary that the joined packages be capable of easy disjuncture and separation into single units by the consumer. It was therefore expedient that the cans be capable of disconnection with a minimum of effort, yet possess sufficient strength in the bond to withstand the stresses of handling and shipping.

Furthermore, it is essential that the cans be capable of being snapped apart without tearing the metal or disfiguring the surface of the containers.

Methods and devices for enacting spot welds have been comprehensively disclosed and widely practiced. This type of welding is a resistance welding process whereby welds are made whose size and shape are limited by the size and contour of one or both electrodes, and the welds are usually circular. It was found, however, that subsequent to the spot welding of metal containers, upon disuniting the cans, a sizable "button" was left; that is, that part of the base metal including all or part of the nugget which tears out and remains attached to one member. It was therefore necessary for applicant to substantially eliminate the button and corona, which is the area surrounding the nugget at the faying surfaces. This expedient required that a "poor" or "shallow" weld be developed.

Now, in accordance with my invention, I have discovered a method of joining a plurality of metal containers which includes conveying individual containers having top and bottom inclosures secured by a metal rim to a welding zone. The containers are then oriented in close proximity in the welding zone and the desired number joined by spot welding the abutting metal rims. The weld is such that when the containers are snapped apart, substantially smooth and non-disfigured faying surfaces result.

Now, having indicated in a general way the nature and purpose of this invention, the following will illustrate the invention. It is to be understood however, that such is presented merely as illustrative and not to be construed as limiting the invention.

*Example 1*

The method was accomplished by a semi-manual process in the following manner: Two 31 gauge electrolytic tin plate quart containers of the "insecticide type" were placed side by side so that the rolled double rims inclosing the top and bottom portions were touching. Two pairs of electrodes, having water-cooled hollow tips, were simultaneously brought to bear at opposite sides of the rolled double rims, one pair contacting the upper rims, the other pair brought to bear against the lower rims. After approximately 390 lbs. of pressure per square inch had been created, the current commenced to flow through the arms or horns of the device, into the electrodes and to the electrode tips and through the work or metal rims. At this point the current was approximately 17,000 amps. per square inch. After the current was allowed to flow for approximately 12 cycles the electrodes were withdrawn. The weld was allowed to cool and the paired cans were snapped apart. No tearing or disfiguring of the metal was noticeable, substantially no button was present and the faying surfaces were smooth.

*Example 2*

The method was accomplished by automatic means in the following manner: The containers were mechanically filled, capped and conveyed to the welding means. Upon approaching this welding means or zone, the individual cans were automatically assembled in close proximity in units of two. In this position each individual container was secured to the adjacent member of the unit by means of pressure sequence welding of the two containers at their rolled double rims or seams. An indexing mechanism automatically synchronized the welding device with a discharge conveyor of the machine serving to cap the containers. Two pairs of electrodes contacted the electrolytic tin plate of the can rims simultaneously, built up a pressure of approximately 400 lbs. and transmitted a current flow for 10 cycles before being withdrawn. A current of approximately 18,000 amps. per square inch was conducted. The joined units were then automatically conveyed out of the welding zone and another unit of yet disjoined members moved into the zone. The welded containers were snapped apart and examined. No tearing or disfiguring of the metal was evident and the faying surfaces of the formerly joined rims were substantially smooth.

Whereas specific pressures have been disclosed in the above examples, as well as times of current flow, and currents in amps. per square inch, it should be appreciated that the method is in no way limited to these calculations. The major criterion for operable success of the method is measured by the total heat generated which is calculated by multiplying the product of the amount of current squared and the resistance of the metal by the length of time current is flowing, the heat being obtained from the resistance of the metal to the flow of the current and the weld being consummated by pressure.

In normal spot welding where a good weld is achieved, a nugget will be created, which may be defined as the melted and resolidified metal joining the parts. I have, however, appreciated that if the containers are to be snapped apart without disfiguring the metal, it is necessary that this nugget be practically eliminated. Normally, in spot welding, a nugget is created which substantially forms an oval, the periphery of such oval residing deep in the metal of the parts welded. Under these conditions when the metal containers are disjoined, the portion of the nugget residing in one or the other can rim will pull out and remain attached to the rim of the other member and thereby form the button. In eliminating this by the method disclosed herein, no true nugget is created but rather only a sticking or binding of the metals at the faying surfaces. It is therefore essential that the technical designation of the heat derived by the above formula be such that it is slightly below the melting point of the metal of which the containers are constructed.

It should be appreciated that the factors involved in deriving the correct amount of heat are highly variable, depending upon the type of metal employed (since all metals have different resistances based on that of copper), the thickness of the metals, etc. For example, the methods disclosed above as typical show the use of containers having end and bottom enclosures secured by a rolled double rim. In the event that a single width rim were contacted the amount of heat necessary to achieve the sticking action herein described would be considerably less.

In the above examples the electrodes have been described as having tips constructed to a specific contour. This too is variable, depending upon the contour of the rim to be welded.

Whereas the above examples have illustrated the use of the method upon containers constructed of electrolytic tin plate, it should be realized that the process is adaptable to the other metals, but especially ferrous-base metals.

The welds or bonds joining the cans together are strong enough to withstand all types of shocks and stresses encountered in shipping and handling; first, because of the metallurgical nature of the bond itself and second, because the welds or bonds are positioned on the can rims, permitting serious stresses only in shear. To provide optimum shear strength it is preferred that the metal containers be joined in two places, at both the upper and lower rims.

It is advocated but not necessary, that the welds be placed off center to facilitate easier and quicker separation by the consumer.

Thus, in accordance with my invention a method has been disclosed for joining a plurality of metal containers by means of resistance welding, and yet permitting the easy disjuncture of the containers without disfiguring or tearing the formerly bonded faying surfaces.

Other modes of applying the principles of the invention may be employed instead of those explained provided the step or steps described in any of the following claims, or the equivalent of such stated step or steps be employed.

I claim:

1. A method of joining a plurality of metal containers comprising conveying individual containers, having top and bottom end closures secured by a metal rim, to a welding zone, orienting a plurality of said metal containers in close proximity to each other in said welding zone, and joining said plurality of said containers by surface fusion of the faying surfaces of the abutting metal rims, said containers being so welded that upon subsequent disjoinder substantially smooth and non-disfigured faying surfaces result.

2. A method of joining two metal containers comprising conveying individual containers, having top and bottom end closures secured by a metal rim, to a welding zone, orienting said two metal containers in close proximity to each other in said welding zone, and joining said containers by surface fusion of the faying surfaces of the abutting metal rims, said containers being so welded that upon subsequent disjoinder substantially smooth and non-disfigured faying surfaces result.

3. A method of joining two metal containers comprising conveying individual containers, having top and bottom end closures secured by a metal rim, to a welding zone, orienting said two metal containers in close proximity to each other in said welding zone, and joining said containers by simultaneously surface fusing the faying surfaces of the abutting top and bottom metal rims of said containers, said containers being so welded that upon subsequent disjoinder substantially smooth and non-disfigured faying surfaces result.

4. A method of joining two ferrous-base metal containers comprising conveying individual containers, having top and bottom end closures secured by a metal rim, to a welding zone, orienting said ferrous-base metal containers in close proximity to each other in said welding zone, and joining said containers by simultaneously surface fusing the faying surfaces of the abutting top and bottom metal rims of said containers, said containers being so welded that upon subsequent disjoinder substantially smooth and non-disfigured faying surfaces result.

5. A method of joining two ferrous-base metal containers comprising automatically conveying individual containers, having top and bottom end closures secured by a metal rim, to a welding zone, automatically orienting said ferrous-base metal containers in close proximity to each other in said welding zone, and joining said containers by simultaneously surface fusing the faying surfaces of the abutting top and bottom metal rims of said containers, said containers being so welded that upon subsequent disjoinder substantially smooth and non-disfigured faying surfaces result.

6. A method of joining a plurality of metal containers comprising conveying individual containers, having top and bottom end closures secured by a metal rim, to a welding zone, orienting a plurality of said metal containers in close proximity to each other in said welding zone, and joining said containers by simultaneously surface fusing the faying surfaces of the abutting top and bottom metal rims of said containers, said containers being so welded that upon subsequent disjoinder substantially smooth and non-disfigured faying surfaces result.

7. A method of joining a plurality of metal containers comprising automatically conveying individual containers, having top and bottom end closures secured by a metal rim, to a welding zone, automatically orienting a plurality of said metal containers in close proximity to each other in said welding zone, and joining said containers by simultaneously surface fusing the faying surfaces of the abutting top and bottom metal rims of said containers, said containers being so welded that upon subsequent disjoinder substantially smooth and non-disfigured faying surfaces result.

8. A method of joining a plurality of ferrous-base metal containers comprising automatically conveying individual containers, having top and bottom end closures secured by a metal rim, to a welding zone, automatically orienting a plurality of said ferrous-base metal containers in close proximity to each other in said welding zone, and joining said containers by simultaneously surface fusing the faying surfaces of the abutting top and bottom metal rims of said containers, said containers being so welded that upon subsequent disjoinder substantially smooth and non-disfigured faying surfaces result.

HENRY A. WESTRICH.

REFERENCES CITED

The following references are of record in the file of this patent:

UNITED STATES PATENTS

| Number | Name | Date |
|---|---|---|
| 1,635,536 | Butler | July 12, 1927 |
| 1,767,521 | Eksergian | June 24, 1930 |
| 2,433,967 | Van Sciver | Jan. 6, 1948 |

OTHER REFERENCES

"Glo-Coat," The Welding Engr., June '49, pages 30-32.